3,132,020
PRODUCTION OF GRANULATED FERTILIZERS
Kurt Tesche, Lovenich, Cologne, and Karl Geiersberger, Cologne-Deutz, Germany, assignors to Chemische Fabrik Kalk, G.m.b.H., Cologne-Kalk, Germany
No Drawing. Filed Jan. 18, 1962, Ser. No. 167,165
Claims priority, application Germany Jan. 19, 1961
1 Claim. (Cl. 71—34)

The present invention relates to an improved process for the production of granulated phosphorus-potassium fertilizers containing water soluble phosphates.

As is known, a mixture of potassium chloride and excess phosphoric acid can be converted into a solution which in addition to free phosphoric acid contains the monopotassium salt of orthophosphoric acid. These can be separated from the solution. It is also possible to leave the monopotassium phosphate in the solution and neutralize its acidity by adding ammonia. The neutralization products thus obtained can then be converted into graunlated fertilizers in known ways.

According to other processes, potassium chloride and phosphoric acid are mixed to form a clear supersaturated solution. This solution or suspension is subsequently sprayed onto a rotating bed of granules preheated to a temperature of 400 to 500° C. which consist of potassium metaphosphate or this and other fertilizer salts. The other fertilizer salts are added to the preheated bed directly and not as an added ingredient of the potassium chloride-phosphoric acid mixture. The stability of the products produced according to this process on storage is good only when the molar $P_2O_5$:$K_2O$ ratio in the reacting mixture amounts to one. Thus employing the above process conditions water insoluble potassium metaphosphate is formed from the potassium chloride and phosphoric acid components. Any excess potassium chloride or phosphoric acid impairs or diminishes the stability upon storage of the end product obtained under these process conditions. In case a fertilizer is to be produced which has a $P_2O_5$:$K_2O$ molar ratio smaller than one, a substance must be added to the starting mixture which reacts with potassium chloride to produce a chloride free product. The phosphorus-potassium fertilizers resulting under these processing conditions only contain $P_2O_5$ in the difficultly soluble form of potassium metaphosphate which cannot be absorbed by plants as easily as water soluble phosphates.

It is therefore an object of this invention to provide a simple process for obtaining a phosphorus-potassium fertilizer which in addition to potassium metaphosphate also contains water soluble phosphates.

According to the invention it was found that such a fertilizer can be produced by spraying a suspension of potassium chloride in potassium chloride saturated phosphoric acid onto a bed of granules of the desired phosphorus-potassium fertilizer maintained in rotary motion and at elevated temperatures. According to this process a mixture having a $P_2O_5$:$K_2O$ molar ratio of 0.9 to 0.3 is produced from phosphoric acid having at least 50% $P_2O_5$ content and potassium chloride which is then sprayed through a flame having a temperature of 1,000 to 1500° C. onto a rotating bed, maintained at temperatures of 260 to 340° C., of granules of the desired phosphorus-potassium fertilizer which contains for each part by weight granules 0.1 to 0.6 part by weight iron spheres.

The process of this invention is carried out advantageously in an exteriorly heated mixing drum. The mixing drum must contain at least one suitable spraying apparatus for the phosphoric acid-potassium chloride mixture and a blast burner for producing a flame with temperatures of 1,000 to 1,500° C.

Aqueous phosphoric acid solutions having 50% or more $P_2O_5$ content as well as potassium chloride of any origin can be employed as starting materials for the process according to the invention as far as they comply with ordinary or customary purity requirements in the production of fertilizers. The components are mixed in such quantities that a suspension of potassium chloride in potassium chloride saturated phosphoric acid results having a $P_2O_5$:$K_2O$ molar ratio of 0.9:0.3. The suspension is then sprayed through a flame having a flame temperature of 1,000 to 1,500° C. onto a rotating bed of granules of the desired phosphorus-potassium fertilizer which is held at temperatures of 260 to 340° C. by the hot burning gases of the blast flame and the exterior heating of the mixing drum.

Upon passage of the sprayed suspension through the blast flame, the phosphoric acid and potassium chloride contained therein react to produce reaction products with brisk evolution of hydrochloric acid. Such reaction products, immediately after their formation, undergo a preliminary condensation. The preliminary condensation products then impinge upon the rotating bed of the desired phosphorus-potassium fertilizer granules where they are converted through further water removal into products having the desired condensation degree. As the evaporating water softens the surface of the existing granules in the rotating bed there is the danger that the granules may stick together to form larger agglomerates or cake on the inner wall of the rotating drum. In this manner a layer or coat of the final product can grow onto the inner wall of the rotating drum so that the heat transfer between the exteriorly heated wall and the circulating granules inside the rotating drum is considerably diminished.

According to the invention these difficulties can be avoided by adding to the bed of the desired phosphorus-potassium fertilizer granules inside the rotating drum 0.1 to 0.6 part by weight iron spheres for each part by weight of the granules. The diameter of the iron spheres is advantageously about ten times the average diameter of the desired fertilizer granules. The iron spheres acting on the rotating bed of granules of the desired phosphorus-potassium fertilizer not only break up the larger agglomerates that may form from the granules, but also hinder the caking of the granules onto the inner wall of the drum. Moreover the iron spheres increase the heat capacity of the rotating bed of granules considerably. The iron pellets in hindering the agglomerate formation and by increasing the heat capacity cause quicker vaporization of the water liberated by condensation in the blast flame of the formed reaction products. The water vaporization from the granules takes place so quickly in the process according to the invention that the granules formed from the sprayed product are dry and can be removed from the rotating drum before the entire $P_2O_5$ contained therein is converted into water insoluble form of potassium metaphosphate.

The granules produced according to the invention, in addition to the water insoluble potassium metaphosphate, contain condensed phosphates, as, for example, pyro- and tripolyphosphates, which are quite water soluble. The proportion of water soluble phosphate with reference to the total $P_2O_5$ content of the fertilizer depends on the temperature maintained in the granule bed. For example, with a granule bed temperature of 260 to 290° C., 36 to 25% of the total $P_2O_5$ is present in the form of water soluble condensed phosphates, and with a bed temperature of 300° C. only 12% or less is present as the water soluble phosphate form.

The fertilizer produced according to the invention possesses outstanding stability on storage and, in addition to water insoluble potassium metaphosphate which is difficult for plants to utilize, contains water soluble condensed phosphates which are available to the plants immediately as an easily utilizable phosphate source.

The water solubility of the $P_2O_5$ content of the fertilizer produced according to this invention can still be increased by treatment of the fertilizer after preheating to 250 to 400° C. with steam.

The hydrochloric acid resulting from the reaction of phosphoric acid with potassium chloride can be recovered according to known processes. The hot drum gases are used for concentration of the phosphoric acid which is employed for producing the suspension used as the starting material.

The process according to the invention provides a new and simple way for producing phosphorus-potassium fertilizers which has the technical advantage over previously known processes of producing a phosphorus-potassium fertilizer having a greater effective range.

The following examples illustrate the invention.

*Example 1*

3,860 parts by weight of phosphoric acid (57.6% $P_2O_5$ content) were mixed with 3,800 parts by weight of finely ground potassium chloride (55.3% $K_2O$ content) to form a suspension, which subsequently was sprayed through a blast flame having a flame temperature of about 1,200° C. onto a bed of the desired phosphorus-potassium fertilizer granules in a rotating mixing drum maintained at a temperature of 250° C. The bed provided at the start consisted of 4,000 parts by weight fertilizer granules and 2,500 parts iron spheres having a diameter of 25 mm.

The resulting granules had a diameter of 1 to 4 mm., mainly 2 to 3 mm., and contained a total $P_2O_5$ content of 42.3%, 42.8% $K_2O$ and 12.6% chlorine. The total $P_2O_5$ content consisted of 12.1% water soluble pyro- and polyphosphates and the remainder was water insoluble potassium metaphosphates.

*Example 2*

3,980 parts by weight of phosphoric acid (57.8% $P_2O_5$ content) were mixed with 3,800 parts by weight finely ground potassium chloride (55.3% $K_2O$ content) and 400 parts by weight sodium chloride (52.5% $Na_2O$ content) to form a suspension, which subsequently was sprayed through a blast flame having a flame temperature of about 1,200° C. onto a bed of the desired phosphorus-potassium fertilizer granules in a rotating mixing drum. The bed provided at the start consisted of 4,000 parts by weight fertilizer granules and 5,000 parts by weight iron spheres having a diameter of 25 mm.

The resulting granules had a diameter of 1 to 4 mm., mainly 2 to 3 mm., and contained a total $P_2O_5$ content of 40.5%, 41.2% $K_2O$ and 13.8% chlorine. Of the total $P_2O_5$ content, 23% was present as water soluble pyro- and polyphosphates and the remainder as water insoluble potassium metaphosphate.

*Example 3*

4,180 parts by weight of phosphoric acid (55% $P_2O_5$ content) were mixed with 3,800 parts by weight of finely ground potassium chloride (55.3% $K_2O$ content) and 200 parts by weight of diatomaceous earth to form a suspension, which subsequently was sprayed through a blast flame having a flame temperature of about 1,200° C. into a bed of granules of the desired phosphorus-potassium fertilizer in a rotating mixing drum at a temperature of 340° C. The bed provided at the start consisted of 4,000 parts by weight fertilizer granules and 4,000 parts by weight iron spheres of 20 mm. diameter.

The resulting granules had a diameter of 1 to 3 mm., mainly 1.5 to 2.5 mm., and contained a total $P_2O_5$ content of 39.9%, 41.5% $K_2O$ and 13.15% chlorine. Of the total $P_2O_5$ 15.8% is present as water soluble pyro- and polyphosphate and the remainder as water insoluble potassium metaphosphate.

We claim:

A process for producing granulated phosphorous-potassium fertilizer containing both potassium metaphosphate and water soluble phosphates comprising (a) mixing phosphoric acid having at least 50% by weight $P_2O_5$ content and potassium chloride to form a suspension having a $P_2O_5:K_2O$ molar ratio of 0.9 to 0.3, (b) spraying the resulting suspension through a flame having a temperature of 1,000 to 1,500° C. onto a bed comprising granules of the desired phosphorous-potassium fertilizer and 1.0 to 0.6 part by weight iron spheres for each part by weight of such fertilizer granules, the diameter of the iron spheres being about ten times the diameter of the phosphorous-potassium fertilizer granules to be produced, and said bed being maintained in rotary motion in a mixing drum and at a temperature between 260° and 340° C.

References Cited in the file of this patent

UNITED STATES PATENTS

| | | |
|---|---|---|
| 2,871,510 | Sackett | Feb. 3, 1959 |
| 2,874,027 | Gloss | Feb. 17, 1959 |
| 2,995,780 | West et al. | Aug. 15, 1961 |
| 3,049,419 | Raistrick et al. | Aug. 14, 1962 |